Figure 1:
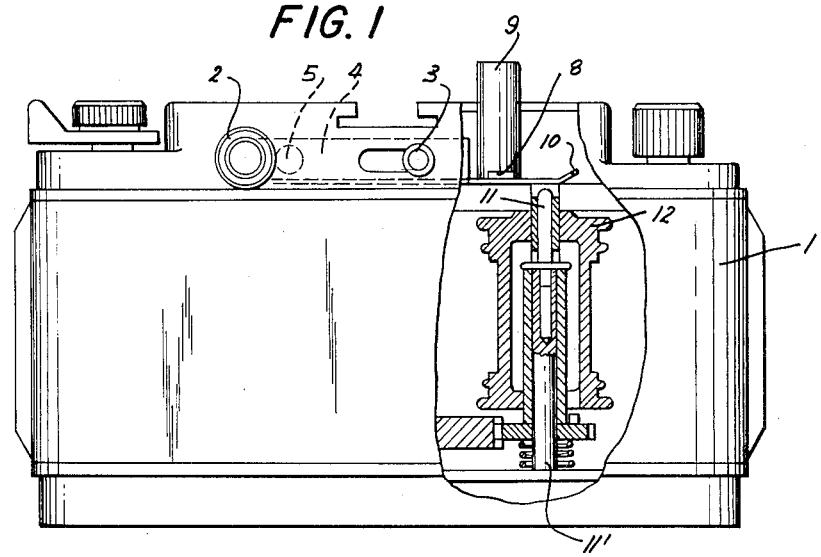

Oct. 16, 1956  E. E. WEISSE ET AL  2,766,669
PHOTOGRAPHIC CAMERA WITH INDICATOR OF READINESS FOR EXPOSURE
Filed Nov. 13, 1951

INVENTORS
Ernst E. Weiss and Willy Franke
BY Michael S. Striker
agt.

United States Patent Office 2,766,669
Patented Oct. 16, 1956

2,766,669

PHOTOGRAPHIC CAMERA WITH INDICATOR OF READINESS FOR EXPOSURE

Ernst E. Weisse and Willy Franke, Dusseldorf, Germany, assignors to Robot, Berning u. Co., Dusseldorf, Germany Application November 13, 1951, Serial No. 255,922

7 Claims. (Cl. 95—31)

This invention relates to photographic cameras provided with means for insuring that the operating parts thereof are in picture-taking position.

Photographic cameras are known in which indicating means are provided in the view finder for the purpose of indicating that the film has not been advanced yet into exposing position. It is also known to provide the camera with means for masking the field of view of the view finder to indicate whether the shutter is cocked. In modern miniature cameras, certain controls must, moreover, be operated to make the camera ready for exposure, but the operation of these controls is quite frequently forgotten. These control operations generally include locking and releasing the shutter cocking mechanism, respectively coupling and uncoupling the means for moving the film preparatory to rewinding it into the cartridge, and drawing out a retractable objective lens.

Generally speaking, the present invention consists of the provision of masking means in the view finder used for indicating the readiness for exposure with respect to the three control operations described above, namely, locking the shutter release, uncoupling the means for advancing the film or drawing out a retractable lens.

Especially when making snapshots, it is very annoying, if, in the moment of making an exposure, it is noticed that some control operation has been forgotten, and that the camera is not ready for exposure. The invention aims to obviate such occurrences if possible. According to the present invention this is rendered possible by providing means whereby the position of the particular functional parts, governing the readiness for exposure, is indicated in the field of view of the view finder. Most desirable for the end in view is the provision of a shutter, controlled by said functional parts, which masks the field of view of the view finder when the camera is not yet ready for exposure, and does not unmask it until the camera is ready for exposure.

These and other objects and advantages reside in certain novel features of construction, arrangement and combination of parts as will hereinafter be more fully described and pointed out in the appended claims.

Figure 2:
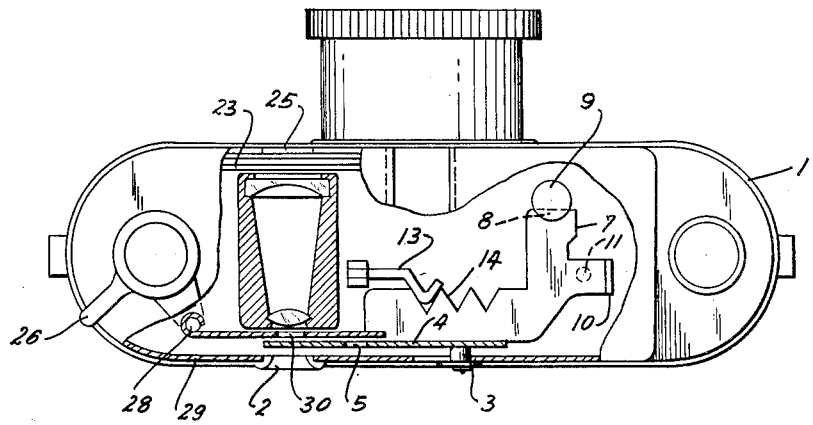

Referring to the drawing:

Fig. 1 is an elevational rear view of the camera partly broken away to show some parts in section, and Fig. 2 is a top plan view with partly broken away top plate to show some parts in section.

In the drawing the numeral 1 indicates a camera housing in which a slide 4 is disposed closely in front of the view finder eyepiece 2 and adapted to be operated from the outside by means of a knob 3. This slide 4 has an aperture 5 which is in register with the view finder eyepiece 2 when said slide is in its inoperative position. This slide 4 also has an angularly bent portion 6 which is positioned on an intermediate wall of the camera casing and provided with a detent 7 adapted to engage a slot 8 of the shutter release button 9. In addition, the slide 4 has a bent-up portion 10 integrally formed therewith and adapted to engage a spring-loaded coupling pin 11. The latter is supported in a hollow sprocket drum 12 the teeth of which engage the film perforations. Depressing the coupling pin 11 will uncouple the sprocket drum 12 from its drive shaft 11' so that it may freely rotate while the film is rewound. As the slide 4, 6 is shifted by means of the knob 3 till the spring pawl 13 engages the rack notch 14, the shutter release button is locked by the detent 7 and cannot be depressed. When not in use, the camera is thus locked as a safeguard against unintentional release of the shutter. In this position of the slide 4, 6, the view finder eyepiece 2 is masked by said slide 4. Upon further shifting of the slide 4, 6, till the last rack notch 14' is engaged by the spring pawl 13, locking the shutter release button 9 by the detent 7 as well as masking the view finder eyepiece 2 will still be maintained. In addition, the coupling pin 11 is, in this position of the slide 4, 6, stressed downwardly by the bent-up portion 10 and thereby the camera set to "Rewind" position. Thus, by providing a single slide 4, 6, which can easily and quickly be fabricated as a stamping, it is not only rendered possible to mask the view finder eyepiece when the camera is not ready for exposure, but also to positively lock the shutter release button 9 when the camera is set to "Rewind," apart from the advantage that the release button 9 can be locked also in the median position of the slide 4, 6 without necessitating setting to "Rewind."

The objective lens is mounted in a retractable lens barrel 15 which slides into the camera casing 1 when not in use. Within the camera housing, when the lens barrel 15 is not locked, and when the objective lens is not ready for picture-taking, a masking plate 23 is moved into a position for masking the field of view of the view finder window 25. The structure for producing this result is, however, not part of the present invention.

The shutter of the camera (not shown in detail) is cocked by moving a lever 26 in the direction of the arrow. A lever arm 27 connected to the shutter cocking lever 26 carries a pin 28 on which is mounted a very thin sheet of steel 29. Upon movement of the lever 26, the thin steel sheet 29 moves in front of the view finder eyepiece 2 and masks it, and does not unmask it by means of an aperture 30 until the lever 26 has been brought into shutter-cocking position.

What is claimed is:

1. In a camera, in combination, a camera housing; a view finder on said camera housing; film transporting means located in said camera housing; release means operatively associated with said film transporting means for selectively releasing the latter for rewinding the film; actuating means engaging said release means for moving the latter between a first position where said film transporting means is released for rewinding of the film and a second position where said film transporting means is set for winding the film; view finder masking means mounted on said camera housing for movement between a view finder masking position and a view finder unmasking position; and operating means connected to said actuating means and masking means for simultaneously operating the latter to locate said view finder masking means in said masking position thereof when said release means is placed in said first position by said actuating means.

2. In a camera, in combination, a camera housing; a view finder on said camera housing; film transporting means located in said camera housing; release means operatively associated with said film transporting means for selectively releasing the latter for rewinding the film; an elongated actuating member movably mounted on said housing for movement to and from a position where said actuating member engages said release means and actuates the latter to release said film transporting means; and a protection fixed to said actuating member and located in said view finder when said actuating member is in said position thereof to mask the view finder when said film transporting means is released for rewinding.

3. In a camera, in combination, a camera housing; a view finder on said camera housing; film transporting means located in said camera housing; release means operatively associated with said film transporting means for selectively releasing the latter for rewinding the film; an elongated actuating member movably mounted on said housing for movement to and from a position where said actuating member engages said release means and actuates the latter to release said film transporting means; a projection fixed to said actuating member and located in said view finder when said actuating member is in said position thereof to mask the view finder when said film transporting means is released for rewinding; an elongated shutter release member movably mounted on said camera housing; and lock means fixed to said actuating member for movement therewith and engaging said shutter release member when said actuating member is in said position thereof to lock said shutter release member against movement for releasing the shutter when said film transporting means is released for rewinding.

4. In a camera, in combination, a camera housing; a view finder on said camera housing; film transporting means located in said camera housing; release means operatively associated with said film transporting means for selectively releasing the latter for rewinding the film; an elongated actuating member movably mounted on said housing for movement from a rest position through an intermediate position to an end position where said actuating member engages said release means to locate the latter in a position where said film transporting means is released for rewinding; a projection fixed to said actuating member and located in said view finder when said actuating member is in said intermediate and end positions thereof; an elongated shutter release member movably mounted on said camera housing; and lock means fixed to said actuating member for movement therewith and engaging said shutter release member when said actuating member is in said intermediate and end positions thereof to lock said shutter release member against movement when said actuating member is in said intermediate position and said film transporting means is not released for rewinding as well as when said actuating member is in said end position and said film transporting means is released for rewinding.

5. In a camera, in combination, a camera housing having a partition in the interior thereof; a view finder located in said camera housing on one side of said partition; a film transporting sprocket mounted in said housing on the other side of said partition for free turning movement; drive means located in said housing for driving said sprocket and including a motion transmitting member movable to and from a position engaging said sprocket for transmitting a drive thereto; pin means fixed to said motion transmitting member and extending through said partition from said other to said one side thereof; spring means engaging said motion transmitting member for urging the latter into said position thereof; and an elongated actuating member movably mounted in said housing on said one side of said partition for movement to and from a position where an end portion of said actuating member engages said pin means and moves the latter together with said motion transmitting member against the action of said spring means out of said position where said motion transmitting member engages said sprocket so as to release the latter for rewinding, said actuating member having a projecting portion located out of said view finder when said end portion of said actuating member has not moved said motion transmitting member out of engagement with said sprocket and located in said view finder when said actuating member is in said position where said motion transmitting member is out of engagement with said sprocket.

6. In a camera as defined in claim 5, said housing being formed with a slot and a pin fixed to said actuating member and extending through said slot to the exterior of said housing so that said actuating member may be manually operated.

7. In a camera as defined in claim 5, an elongated shutter releasing member movably mounted on said housing and being formed with a cutout, and said actuating member having an edge portion located in said cutout just before and when said actuating member is located in said position engaging said pin means to locate said motion transmitting member out of engagement with said sprocket so that said actuating member is operable to prevent operation of said shutter releasing member when said film transporting sprocket is released from said drive means as well as when said sprocket is connected to said drive means.

References Cited in the file of this patent

UNITED STATES PATENTS

| | | |
|---|---|---|
| 1,200,174 | Dense | Oct. 3, 1916 |
| 1,289,256 | Peterson | Dec. 31, 1918 |
| 1,321,868 | Weiss | Nov. 18, 1919 |
| 1,356,583 | Woodworth | Oct. 26, 1920 |
| 1,477,038 | Cubbage | Dec. 11, 1923 |
| 1,478,318 | Woodworth | Dec. 18, 1923 |
| 1,588,666 | Donchian | June 15, 1926 |
| 1,696,533 | Gage | Dec. 25, 1928 |
| 1,805,424 | Stankewitz | May 12, 1931 |
| 2,229,848 | Harter | Jan. 28, 1941 |
| 2,289,800 | Nagel | July 14, 1942 |
| 2,637,253 | Noack | May 5, 1953 |